(12) United States Patent
Weigelt

(10) Patent No.: US 8,291,814 B2
(45) Date of Patent: Oct. 23, 2012

(54) METHOD OF USING A PROTECTIVE BARBEQUE MAT

(76) Inventor: Recia Weigelt, Snohomish, WA (US)

( * ) Notice: Subject to any disclaimer, the term of this patent is extended or adjusted under 35 U.S.C. 154(b) by 677 days.

(21) Appl. No.: 12/352,866

(22) Filed: Jan. 13, 2009

(65) Prior Publication Data
US 2010/0175564 A1 Jul. 15, 2010

(51) Int. Cl.
A47J 37/07 (2006.01)
(52) U.S. Cl. .......................... 99/444; 114/361
(58) Field of Classification Search .................. 99/444; 114/361, 364; 126/24, 50, 51, 221, 280; 150/166; 224/42.11, 42.31, 275, 406, 429, 224/430; 428/131, 192; 5/417; 280/770; A47J 37/07
See application file for complete search history.

(56) References Cited

U.S. PATENT DOCUMENTS

| D118,716 | S |   | 1/1940  | Zito |             |
|----------|---|---|---------|------|-------------|
| 2,311,514 | A | * | 2/1943  | Bramblett | 150/166 |
| 2,574,786 | A | * | 11/1951 | Hiatt | 383/38 |
| 2,979,190 | A | * | 4/1961  | Daigle | 224/42.31 |
| 3,110,397 | A | * | 11/1963 | Peck et al. | 224/406 |
| 3,176,315 | A | * | 4/1965  | Freund | 5/417 |
| D233,025 | S | * | 10/1974 | Dague | D12/422 |
| 3,862,876 | A | * | 1/1975  | Graves | 5/417 |
| 4,372,243 | A | * | 2/1983  | Roope, Jr. | 114/364 |
| 4,512,044 | A | * | 4/1985  | Clark | 428/131 |
| 4,729,535 | A | * | 3/1988  | Frazier et al. | 126/24 |
| 4,781,231 | A | * | 11/1988 | Garcia et al. | 224/42.11 |
| 4,901,706 | A | * | 2/1990  | Schwanke, Jr. | 126/221 |
| D309,227 | S |   | 7/1990  | Popiolkowski | |
| 5,129,678 | A | * | 7/1992  | Gurbacki | 150/166 |
| 5,347,667 | A | * | 9/1994  | Schwarz et al. | 5/418 |
| D357,609 | S |   | 4/1995  | Webb et al. | |
| 5,411,011 | A | * | 5/1995  | Teta | 126/50 |
| D374,378 | S | * | 10/1996 | Hyden et al. | D7/402 |
| D379,730 | S |   | 6/1997  | Dickman | |
| 5,849,390 | A | * | 12/1998 | Dillon | 150/166 |
| 5,868,270 | A | * | 2/1999  | Sandaj et al. | 220/571 |
| 5,945,194 | A | * | 8/1999  | Pester | 150/166 |
| 5,947,241 | A | * | 9/1999  | Rausch | 190/108 |
| D421,543 | S |   | 3/2000  | Rogman et al. | |
| 6,061,850 | A | * | 5/2000  | Roper, III | 5/417 |
| RE36,775 | E | * | 7/2000  | Hoheisel | 428/66.1 |
| D447,662 | S |   | 9/2001  | Martinez et al. | |
| 6,283,260 | B1 | * | 9/2001 | Yasuda, Sr. | 190/102 |
| D450,970 | S |   | 11/2001 | Self | |
| 6,419,988 | B1 | * | 7/2002 | Sovell | 427/322 |
| D467,248 | S |   | 12/2002 | Welles | |
| 6,607,805 | B1 | * | 8/2003 | Clark | 428/131 |
| 6,609,626 | B2 |   | 8/2003 | Young et al. | |
| 6,901,615 | B1 | * | 6/2005 | Lombardo et al. | 5/417 |

(Continued)

FOREIGN PATENT DOCUMENTS
JP 57174629 A * 10/1982

Primary Examiner — Stephen F Gerrity
(74) Attorney, Agent, or Firm — Priya Sinha Cloutier

(57) ABSTRACT

The present invention is a mat that drapes over a transom or other barbeque area on a boat. The primary objective of the current invention is to keep transom, caulk, and upholstery on boats clean from splats and splatter caused during on board barbequing. Another objective of the invention is to provide a place to securely store barbeque accoutrements when using barbeque on a boat. The mat is placed over the barbeque area prior to barbequing. The mat can easily be folded and stowed.

10 Claims, 5 Drawing Sheets

U.S. PATENT DOCUMENTS

| | | | |
|---|---|---|---|
| 7,096,526 B1 * | 8/2006 | Ogan | 5/417 |
| 7,188,617 B1 * | 3/2007 | O'Blenes | 126/24 |
| D540,099 S | 4/2007 | Tucker | |
| 7,374,240 B2 | 5/2008 | Gold et al. | |
| D596,890 S | 7/2009 | Sulier | |
| 2004/0182899 A1 * | 9/2004 | Deutchman | 224/410 |
| 2005/0230443 A1 | 10/2005 | Bredeson | |
| 2007/0210128 A1 * | 9/2007 | Tilby | 224/406 |

* cited by examiner

METHOD OF USING A PROTECTIVE BARBEQUE MAT

CROSS-REFERENCES TO RELATED APPLICATIONS

Not Applicable

STATEMENT REGARDING FEDERALLY SPONSORED RESEARCH OR DEVELOPMENT

Not Applicable

INCORPORATION-BY-REFERENCE OF MATERIAL SUBMITTED ON A COMPACT DISC

Not Applicable

BACKGROUND

The use of barbeques on boats has become increasingly popular. Barbeques used on boats must be secured to the boat. The most popular boat barbeques are shown in FIGS. 1 and 2. The barbeque in FIG. 1 is usually attached to the transom of the boat via single arm (200). The barbeque in FIG. 2 is usually attached to the railing of the boat using two brackets (300). Although these types of barbeques are safe to use on a boat, barbequing is a messy process; splats and spills happen.

Additionally, as anyone who barbeques knows, there are barbeque accoutrements that need to be kept close by while barbequing. For example, spatulas, tongs, brushes, and/or sauces, are usually kept within reach of a barbeque. On a conventional barbeque, these items can be kept nearby; for example, on a table or attached to the conventional barbeque. On boats, everything must be secured or stashed so they are not affected by the sway of the waves or the force of the wind.

Accordingly, the purpose of the current invention is two-fold. The first is to provide an apparatus that will help keep transom, caulk, and upholstery, or other parts of the boat, clean. The second is to provide a place to securely store barbeque accoutrements when using barbeque on a boat.

BRIEF SUMMARY OF THE INVENTION

The present invention is a mat that drapes over a transom or other barbeque area on a boat. The primary objective of the current invention is to keep transom, caulk, and upholstery on boats clean from splats and splatter caused by on board barbequing. Another objective of the invention is to provide a place to securely store barbeque accoutrements when using a barbeque on the boat. Referring to FIG. 1, when an arm type barbeque is used, the mat (10) is place over the arm (200) before attaching the barbeque to the arm. Referring to FIG. 2, when a bracket type barbeque is used, the mat (10) is placed on the barbeque area before the barbeque brackets (300) are attached to the boat. In each case the mat (10) is placed with the pocket end (50) hanging toward the cook. The mat can easily be folded and stowed.

Preferably, the mat is made of machine washable, cotton duck cloth and is rectangular—approximately 36"×48". The middle section of the mat has a thickness greater than the rest of the mat. However, it will be obvious to those skilled in the art that the mat be made of any kind of material and take the form of any shape. Further, depending upon the type of boat barbeque, the middle section of the mat has either one hole or two holes.

One end of the mat is weighted so that the mat does not move around in wind. The other end of the mat, the side located near the cook, has pockets that securely hold barbeque accoutrements.

BRIEF DESCRIPTION OF THE SEVERAL VIEWS OF THE DRAWINGS

Other features and advantages of the present invention will become apparent in the following detailed descriptions of the preferred embodiment with reference to the accompanying drawings, of which.

DETAILED DESCRIPTION OF THE INVENTION

The present invention is described more fully hereinafter with reference to the accompanying drawings, in which preferred embodiments of the invention are shown. This invention may, however, be embodied in many different forms and should not be construed as limited to the embodiments set for herein; rather, these embodiments are provided so that this disclosure will be thorough and complete and will fully convey the scope of the invention to those skilled in the art.

Figure 3:
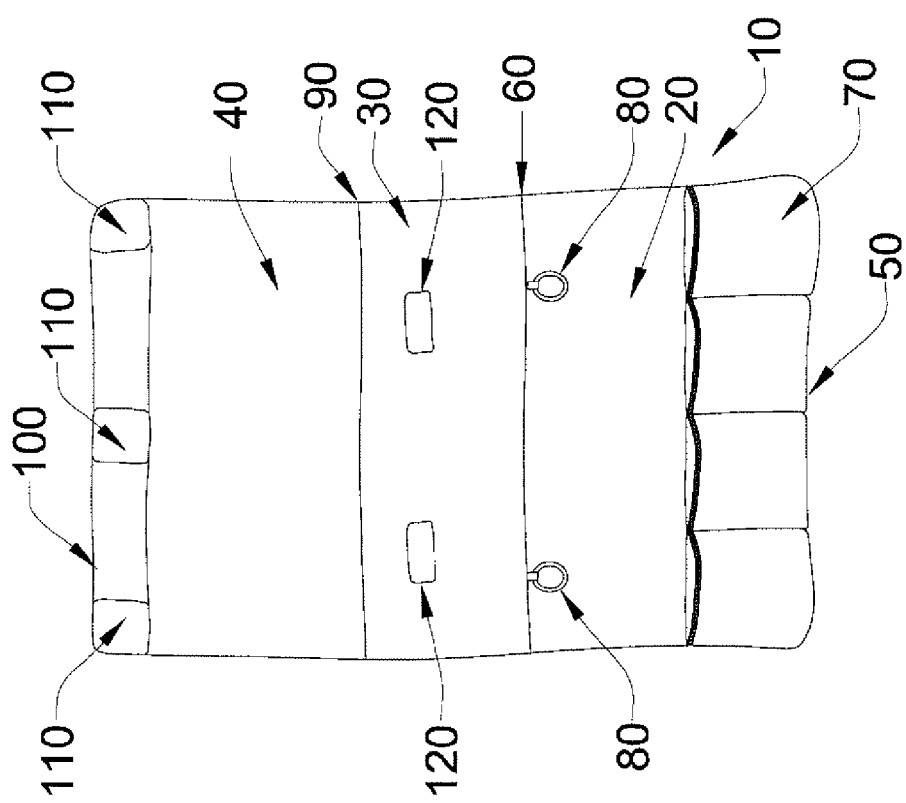
FIG. 3 is an elevation view of a preferred embodiment.
Figure 4:
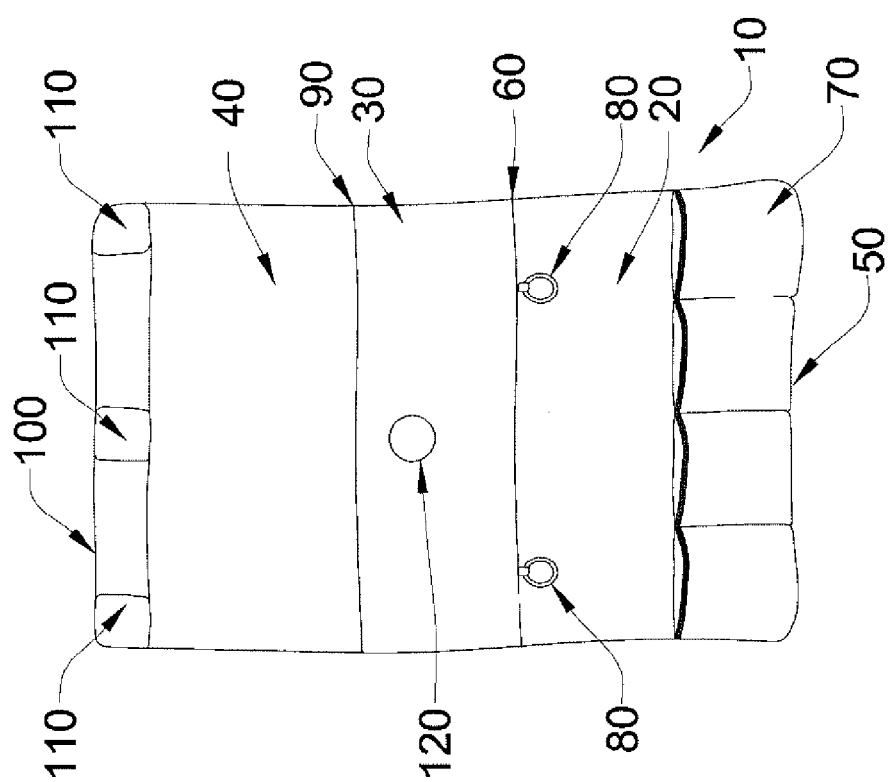
FIG. 4 is an elevation view of a preferred embodiment.
Figure 5:
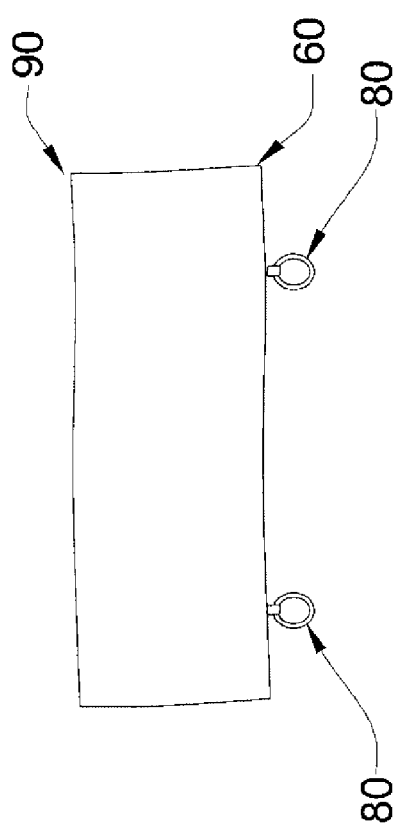
FIG. 5 is a detail view of apparatus allowing user to secure barbeque accoutrements to mat.
Figure 6:
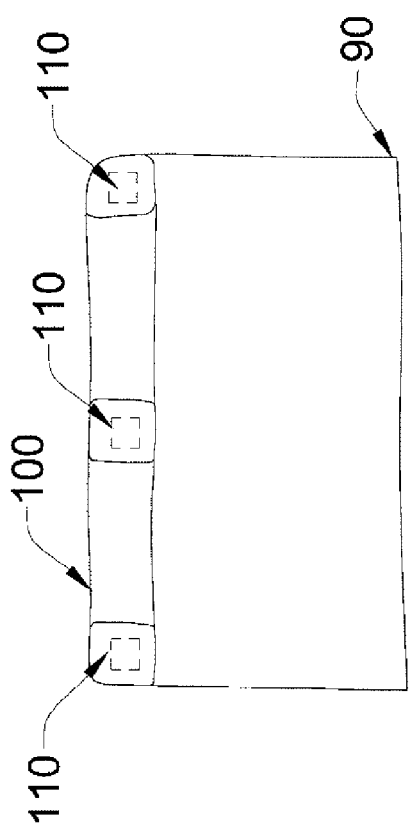
FIG. 6 is a detail view of weighting method.

Referring to FIGS. 3 and 4, the present invention is a mat (10) that drapes over a transom of a boat or other barbeque area to keep transom, caulk, and upholstery clean from splats and splatters. The mat (10) comprises a sheet which is divided into three sections for ease of description; said three sections comprise a first section (20), a middle section (30), and a second section (40).

The first section (20) is defined by a pocket end (50) and a first-middle border end (60). The pocket end (50) comprises at least one pocket (70). The first-middle border end (60) comprises at least one apparatus on which barbeque implements can be hung (80). In a preferred embodiment, said apparatus are d-rings.

The middle section (30) is defined by a first-middle border (60) and a second-middle border (90). Preferably, the middle section (30) has a thickness which is a multiple of the thickness of the first section (20). The first section (20) is equivalent to the second section (40) in thickness.

In a preferred embodiment, the middle section (30) defines a hole (120) in its center; optimally, the hole is approximately 3" in diameter. This embodiment is used with the barbeque shown in FIG. 1.

In another preferred embodiment, the middle section (30) defines a least two holes (120); optimally, the holes (120) are 3"×7" rectangles and offset approximately 5" from the center of the material. This embodiment is used with the barbeque shown in FIG. 2.

The second section (40) is defined by a second-middle border (90) and a weighted border (100). The weighted border (100) comprises weight (110) that is evenly distributed through the border. The weight (110) must be sufficient so as to hold the weighted end in place when in use.

Preferably, the mat (10) is made of machine washable, cotton duck cloth and is rectangular—approximately 36"×

48". However, it will be obvious to those skilled in the art that the mat (10) can be made of any kind of material and take the form of any shape.

Figure 1:
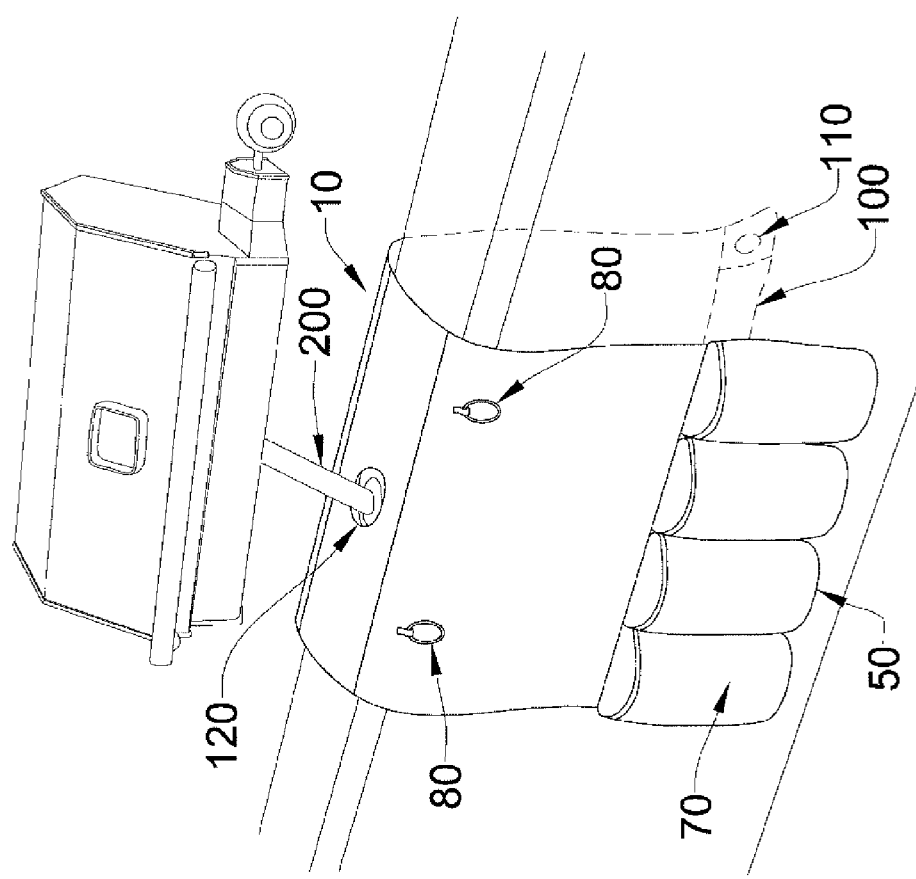
FIG. 1 is an elevation view of how the mat is used with an on board barbeque attached to the transom.
Figure 2:
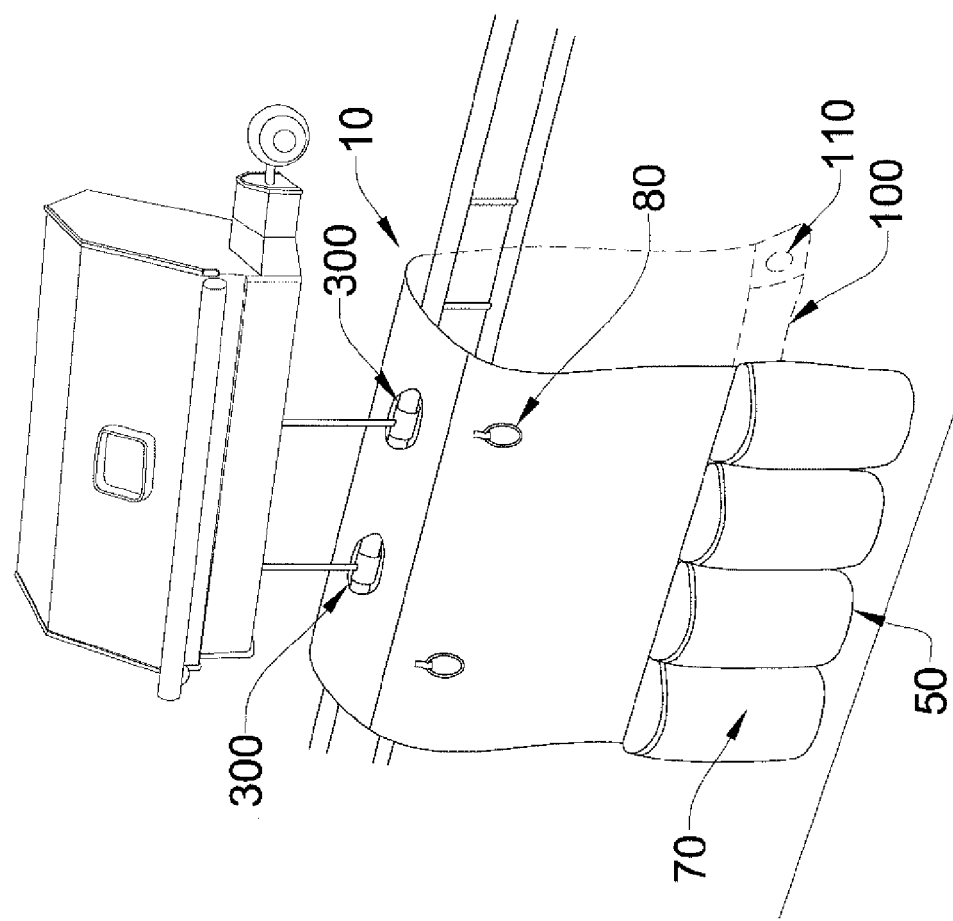
FIG. 2 is an elevation view of how the mat is used with an on board barbeque attached to railings.

Referring to FIG. 1, when an arm type barbeque is used, the mat (10) is place over the arm (200) before attaching the barbeque to the arm. Referring to FIG. 2, when a bracket type barbeque is used, the mat (10) is placed on the barbeque area before the barbeque brackets (300) are attached to the boat. In each case the mat (10) is placed with the pocket end (50) hanging toward the cook.

While the present application has been directed specifically to protection of spill and splatter on a boat caused by the use of on board barbeques, it can also be used in other applications where the purposes achieved by the present invention are readily desired. So, for example, the mat (10) can also be used on balcony barbeques, which are also attached via a bracketing system, to balcony railing, to prevent spill and splatter on the railing. The mat (10) would also provide a narrow balcony with a place to stow barbeque accoutrements.

What is claimed:

1. A method of using a mat with an arm type barbeque, in which the mat drapes over a transom of a boat, the boat having an arm projecting from the transom, so as to keep the transom of the boat clean from splats and splatters emitted from the barbeque, the method comprises the following steps:
    providing said mat, wherein the mat comprises:
        a first section, a middle section, and a second section;
        wherein the first section defines a pocket end and a first-middle border end;
        wherein the second section is defined by a second-middle border and a weighted border;
        wherein the middle section is attached to the first section at the first-middle border;
        wherein the middle section is attached to the second section at the second-middle border;
        wherein the middle section includes a hole therein;
    passing the arm through the hole of the mat and locating the mat on the boat such that the mat is draped over the transom of the boat;
    positioning the mat over the arm with the pocket end facing the boat interior; and
    securing the barbeque to the arm.

2. The method of claim 1, wherein the pocket end of the mat comprises at least one pocket.

3. The method of claim 1, wherein the first-middle border end of the mat comprises at least one securing device that allows barbeque accoutrements to be secured to the mat.

4. The method of claim 1, wherein the hole is located in a center of the mat.

5. The method of claim 1, wherein the weighted border of the mat is evenly distributed.

6. A method of using a mat with a bracket type barbeque, the barbeque having first and second arms with a bracket at the end of each arm for attachment of the barbeque to a boat railing, in which the mat drapes over the railing of the boat so as to keep the railing of the boat clean from splats and splatters emitted from the barbeque, the method comprises the following steps:
    providing said mat, wherein the mat comprises:
        a first section, a middle section, and a second section;
        wherein the first section defines a pocket end and a first-middle border end;
        wherein the second section is defined by a second-middle border and a weighted border;
        wherein the middle section is attached to the first section at the first-middle border;
        wherein the middle section is attached to the second section at the second-middle border;
        wherein the middle section includes first and second holes therein;
    positioning the mat over the railing of the boat and locating the mat on the boat such that the mat is draped over the railing of the boat;
    positioning the mat over the railing of the boat with the pocket end facing the boat interior;
    passing the brackets of the barbeque through the first and second holes in the mat; and
    securing the brackets of the barbeque to the railing of the boat.

7. The method of claim 6, wherein the pocket end of the mat comprises at least one pocket.

8. The method of claim 6, wherein the first-middle border end of the mat comprises at least one securing device that allows barbeque accoutrements to be secured to the mat.

9. The method of claim 6, wherein holes are rectangular in shape and are offset equidistance from a center of the middle section.

10. The method of claim 6, wherein the weighted border of the mat is evenly distributed.

* * * * *